United States Patent
Prasad et al.

(10) Patent No.: US 10,575,319 B2
(45) Date of Patent: Feb. 25, 2020

(54) TWO-STAGE ALGORITHM FOR UPLINK COMP

(71) Applicants: NEC Laboratories America, Inc., Princeton, NJ (US); NEC Corporation, Tokyo (JP)

(72) Inventors: Narayan Prasad, Willow Grove, PA (US); Sampath Rangarajan, Bridgewater, NJ (US); Caroline Liang, Surrey (GB)

(73) Assignee: NEC Corporation (JP)

( * ) Notice: Subject to any disclaimer, the term of this patent is extended or adjusted under 35 U.S.C. 154(b) by 0 days.

(21) Appl. No.: 15/485,888

(22) Filed: Apr. 12, 2017

(65) Prior Publication Data

US 2017/0303296 A1 Oct. 19, 2017

Related U.S. Application Data

(60) Provisional application No. 62/322,862, filed on Apr. 15, 2016.

(51) Int. Cl.

| | |
|---|---|
| *H04L 5/00* | (2006.01) |
| *H04W 52/14* | (2009.01) |
| *H04L 1/00* | (2006.01) |
| *H04W 52/02* | (2009.01) |
| *H04W 72/08* | (2009.01) |
| *H04W 72/12* | (2009.01) |
| *H04W 52/24* | (2009.01) |

(Continued)

(52) U.S. Cl.
CPC ....... *H04W 72/1226* (2013.01); *H04L 5/0035* (2013.01); *H04L 5/0075* (2013.01); *H04L 5/0082* (2013.01); *H04W 52/146* (2013.01); *H04W 52/244* (2013.01); *H04W 16/32* (2013.01); *H04W 84/045* (2013.01)

(58) Field of Classification Search
CPC .. H04W 28/08; H04W 52/146; H04W 52/244
USPC .......................................... 455/522; 370/328
See application file for complete search history.

(56) References Cited

U.S. PATENT DOCUMENTS

| | | | |
|---|---|---|---|
| 2013/0070741 A1* | 3/2013 | Li | H04W 72/046 370/338 |
| 2013/0077494 A1* | 3/2013 | Samdanis | H04B 7/155 370/235 |

(Continued)

OTHER PUBLICATIONS

Vaibhav Singh et al., "Optimizing User Association and Activation Fractions in Heterogeneous Wireless Networks", Cornell University Library. Computer Science, Networking and Internet Architecture. Mar. 23, 2015. pp. 1-15.

(Continued)

*Primary Examiner* — Asad M Nawaz
*Assistant Examiner* — Jason A Harley
(74) *Attorney, Agent, or Firm* — Joseph Kolodka

(57) ABSTRACT

A computer-implemented method for associating users to transmission points over an uplink (UL) of a heterogeneous network (HetNet) is presented. The computer-implemented method includes communicating, via the processor, with a cluster of transmission points, associating each user to one transmission point within the cluster of transmission points by a two-stage procedure, and performing sub-frame scheduling independently by each transmission point within the cluster of transmission points over a set of users associated with.

4 Claims, 4 Drawing Sheets

(51) Int. Cl.
*H04W 16/32* (2009.01)
*H04W 84/04* (2009.01)

(56) References Cited

U.S. PATENT DOCUMENTS

| | | | | |
|---|---|---|---|---|
| 2014/0044061 | A1* | 2/2014 | Yue | H04W 72/042 370/329 |
| 2014/0307685 | A1* | 10/2014 | Takano | H04W 24/02 370/329 |
| 2015/0071079 | A1* | 3/2015 | Kadosh | H04L 45/04 370/237 |
| 2015/0092558 | A1* | 4/2015 | Prasad | H04W 28/08 370/235 |
| 2016/0337087 | A1* | 11/2016 | Chen | H04L 1/1822 |
| 2018/0279228 | A1* | 9/2018 | Viering | H04W 52/146 |

OTHER PUBLICATIONS

Narayan Prasada et al., "Exploiting Cell Dormancy and Load Balancing in LTE HetNets: Optimizing the Proportional Fairness Utility", IEEE Transactions on Communications. vol. 62, No. 10. Sep. 23, 2014. pp. 3706-3722.

* cited by examiner

TWO-STAGE ALGORITHM FOR UPLINK COMP

RELATED APPLICATION INFORMATION

This application claims priority to Provisional Application No. 62/322,862, filed on Apr. 15, 2016, incorporated herein by reference in its entirety.

BACKGROUND

Technical Field

The present invention relates to wireless networks and, more particularly, to a two-stage algorithm for an uplink coordinated multipoint (CoMP) scheme in a heterogeneous wireless network.

Description of the Related Art

CoMP transmission/reception has been considered as a promising technology by 3GPP (3rd Generation Partnership Project) LTE-A (Long Term Evolution-Advanced) due to its potential to improve coverage, cell-edge throughput, and/or spectrum efficiency of signal transmission. Since coordinated scheduling/beamforming (CS/CB) does not require data sharing among multiple transmission points (TPs), it has become the most feasible implementation scheme for CoMP in the case of X2-based multiple eNBs (evolved Node B or base station) coordination. In CB, the transmit-side precoding applied to downlink transmissions is coordinated between TPs in order to reduce interference between the coverage areas of different TPs. In CS, transmission powers and resource allocations are coordinated in order to reduce interference.

SUMMARY

A computer-implemented method for associating users to transmission points over an uplink (UL) of a heterogeneous network (HetNet) is presented. The method includes communicating, via the processor, with a cluster of transmission points, associating each user to one transmission point within the cluster of transmission points by a two-stage algorithm, and performing sub-frame scheduling independently by each transmission point within the cluster of transmission points over a set of users associated with it.

A system for associating users to transmission points over an uplink (UL) of a heterogeneous network (HetNet) is presented. The system includes a memory and a processor in communication with the memory, wherein the processor is configured to communicate, via the processor, with a cluster of transmission points, associate each user to one transmission point within the cluster of transmission points by a two-stage algorithm, and perform sub-frame scheduling independently by each transmission point within the cluster of transmission points over a set of users associated with it.

A non-transitory computer-readable storage medium comprising a computer-readable program for associating users to transmission points over an uplink (UL) of a heterogeneous network (HetNet) is presented, wherein the computer-readable program when executed on a computer causes the computer to perform the steps of communicating, via the processor, with a cluster of transmission points, associating each user to one transmission point within the cluster of transmission points by a two-stage algorithm, and performing sub-frame scheduling independently by each transmission point within the cluster of transmission points over a set of users associated with it.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
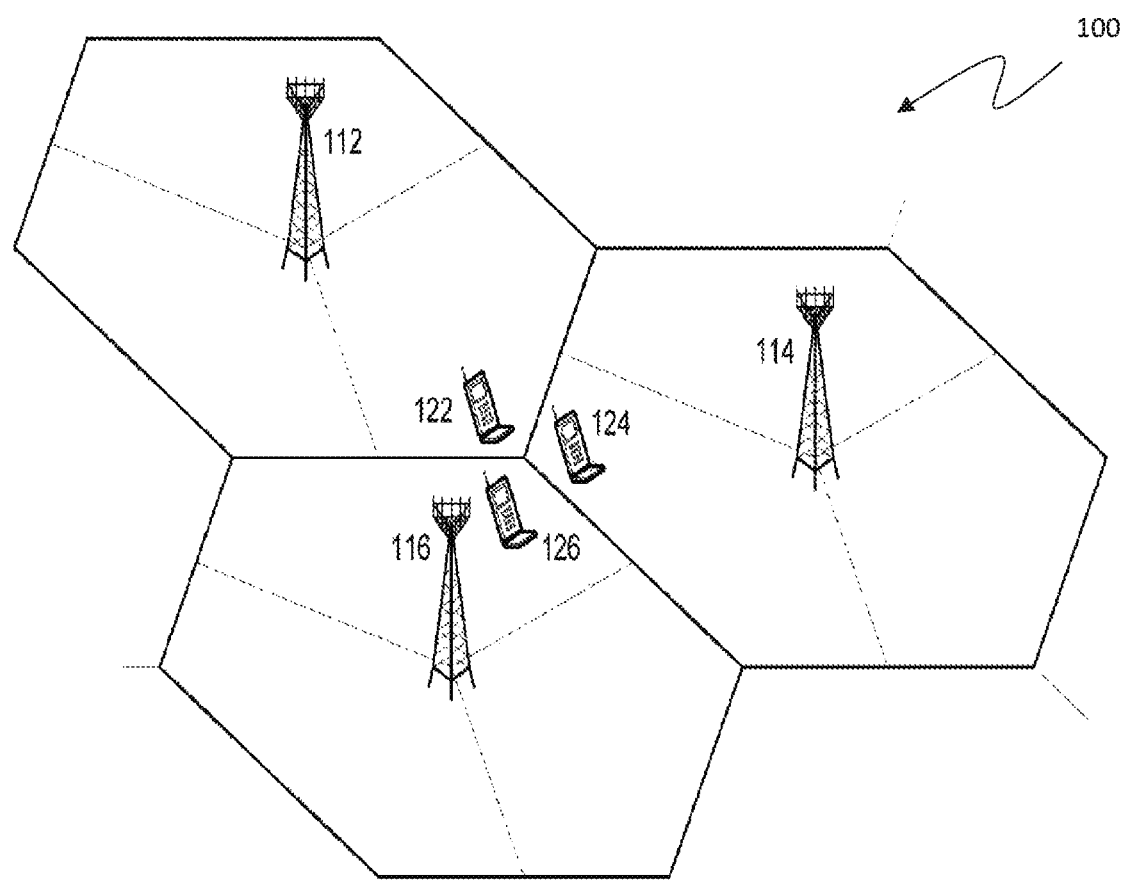
FIG. 1 is a block/flow diagram of an example coordinated multipoint (CoMP) set in a wireless cellular network.

In one aspect, the method, system, and non-transitory computer-readable storage medium relate to the uplink (UL) of a heterogeneous wireless network (HetNet). HetNets are expected to be fairly common future wireless networks. The focus of the exemplary embodiments is mainly on scenarios where the transmission points (TPs) in the HetNet are connected to each other by a non-ideal backhaul with a relatively high latency (e.g., up-to several dozens of milliseconds).

Over such HetNets, schemes that strive to obtain all coordinated resource management decisions within the fine slot-level granularity (e.g., a millisecond) are not suitable, since coordination (which involves exchange of messages and signaling over the backhaul) cannot be performed in such a fast manner. Instead, semi-static resource management schemes, where resource management over the set of TPs is performed at two time scales, are suitable since they are more robust toward backhaul latency.

In one aspect, the method, system, and non-transitory computer-readable storage medium include one such semi-static resource management scheme. The exemplary embodiments focus on a cluster of TPs that can include multiple high power macro TPs, as well as several low power pico TPs. The management scheme optimizes load balancing (a.k.a. user association), wherein users are associated to the TPs in that cluster, such that each user is associated to any one TP over the frame duration.

Interference management over such a HetNet cluster is complicated due to the backhaul latency, irregular topology and the interference variability (i.e., coupling of interference with association) arising in the UL. The underlying coordination in the present scheme can be performed periodically at a coarser frame-level granularity based on averaged (not instantaneous) slowly varying metrics that are relevant for a period longer than the backhaul latency. Examples of such metrics include estimates of average rates that the users can receive from those TPs under, e.g., different configurations. On the other hand, the resource management that is performed at a much finer sub-frame/slot level granularity involves no coordination among TPs and is performed independently by each active TP based on fast changing information, such as instantaneous rates or SINRs, that are estimated directly by that TP for the users associated to it.

In one aspect, the method, system, and non-transitory computer-readable storage medium determine the user association by optimizing the proportional-fairness system utility, over each frame. The exemplary embodiments of the present invention address the interference variability issue that arises in UL load balancing, i.e., the interference seen at each TP depends on the users associated with other neighboring TPs. The present formulation considers a wideband model for the uplink and hence is applicable to a practical long-term evolution (LTE) UL. Moreover, UL power control is also incorporated to allow for setting interference limits. Thus, the present invention considers load balancing for a wideband UL with power control.

In one aspect, the method, system, and non-transitory computer-readable storage medium describe the user association step by a two-stage algorithm in which each user is associated to one transmission point (TP). Once user association is determined, the fine time-scale sub-frame scheduling can be performed independently by each TP over the set of users associated to it. The proportional fairness utility (sum of log of average user rates) is considered as the system utility. The user association can be performed via either the greedy-plus-local search algorithm or the baseline-plus-local search algorithm. In the greedy-plus-local search algorithm, the first stage is a greedy stage which is followed by a local search based second stage. In the baseline-plus-local search algorithm, the first stage is identical to the baseline association, where each user is independently associated to the TP from which it sees the strongest average signal strength, which then is again followed by a local search based second stage.

The techniques described herein may be used for various wireless communication networks such as CDMA, TDMA, FDMA, OFDMA, SC-FDMA and other networks. The terms "network" and "system" are often used interchangeably.

A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards.

A TDMA network may implement a radio technology such as Global System for Mobile Communications (GSM).

An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS).

3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP).

In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB (e.g., a macro base station). An eNB for a pico cell may be referred to as a pico eNB (e.g., a pico base station). An eNB for a femto cell may be referred to as a femto eNB (e.g., a femto base station) or a home eNB.

The wireless network described herein may also include, e.g., relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs.

The wireless network may be, e.g., a heterogeneous network (HetNet) that includes eNBs of different types, e.g., macro eNBs, pico eNBs, femto eNBs, relays, etc. These different types of eNBs may have different transmit power levels, different coverage areas, and different impact on interference in the wireless network. For example, macro eNBs may have a high transmit power level (e.g., 20 watts) whereas pico eNBs, femto eNBs, and relays may have a lower transmit power level (e.g., 1 watt).

The wireless network described herein may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller may couple to a set of eNBs and provide coordination and control for these eNBs. The network controller may communicate with eNBs via a backhaul. The eNBs may also communicate with one another, e.g., directly or indirectly via wireless or wireline backhaul.

The UEs may be dispersed throughout the wireless network, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, etc. A UE may be able to communicate with macro eNBs, pico eNBs, femto eNBs, relays, etc.

Heterogeneous networks (HetNets) can be used to handle the increased traffic loads on the macro nodes due to increased usage and functionality of wireless devices. HetNets can include a layer of planned high power macro nodes (or macro-eNBs) overlaid with layers of lower power nodes (small-eNBs, micro-eNBs, pico-eNBs, femto-eNBs, or home eNBs [HeNBs]) that can be deployed in a less well planned or even entirely uncoordinated manner within the coverage area (cell) of a macro node. The lower power nodes (LPNs) can generally be referred to as "low power nodes", small nodes, or small cells.

The macro node can be used for basic coverage. The low power nodes can be used to fill coverage holes within a macro node's geographic coverage area (i.e., cell) and at the boundaries between the macro nodes' coverage areas. Low power nodes can also be used to improve capacity in high use areas and improve indoor coverage where building structures impede signal transmission.

Homogeneous networks or HetNets can use time-division duplexing (TDD) or frequency-division duplexing (FDD)

for DL or UL transmissions. Time-division duplexing (TDD) is an application of time-division multiplexing (TDM) to separate downlink and uplink signals. In TDD, downlink signals and uplink signals may be carried on a same carrier frequency where the downlink signals use a different time interval from the uplink signals, so the downlink signals and the uplink signals do not generate interference for each other. TDM is a type of digital multiplexing in which two or more bit streams or signals, such as a downlink or uplink, are transferred apparently simultaneously as subchannels in one communication channel, but are physically transmitted on different resources. In frequency-division duplexing (FDD), an uplink transmission and a downlink transmission can operate using different frequency carriers. In FDD, interference can be avoided because the downlink signals use a different frequency carrier from the uplink signals.

As used herein, the terms "node" and "cell" are both intended to be synonymous and refer to a wireless transmission point operable to communicate with multiple user equipment, such as an eNodeB or a low power node.

HetNet (Heterogeneous Network) has received a lot of interest in the wireless industry. In a HetNet, a tier including multiple low-power nodes is added onto existing macro base stations to expand or improve the coverage. An existing macro base station works as a master and one or more Low Power Nodes (LPNs) work as slaves of the master in order to have better interference managements and resource allocation.

As in a traditional cellular wireless network, a HetNet can use several uplink and downlink reference signals for maintaining or improving network efficiency. Some downlink reference signals (i.e., reference signals transmitted from a network-side transmission point to wireless devices) may be unicast (i.e., intended to be received by one wireless device), while other reference signals may be broadcast (i.e., for reception by multiple wireless devices). In addition, the availability of geographically distributed transmission points opens up possibilities of achieving further operational improvements.

The wireless communication network of the exemplary embodiments of the present invention may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station. A base station may transmit data and control information on the downlink to a UE and/or may receive data and control information on the uplink from the UE.

FIG. 1 illustrates an example CoMP set in a wireless cellular network 100. The CoMP set includes base stations 112, 114, and 116, and mobile users 122, 124, and 126. Each base station covers a macro cell with one or more cell sectors. In FIG. 1, there are 3 cell sectors in each macro cell. In non-CoMP mode, the serving base stations for mobile users 122, 124, and 126 are base stations 112, 114, and 116, respectively. That is, mobile user 122 is connected to base station 112, mobile user 124 to base station 114, and mobile user 126 to base station 116. Since mobile users 122, 124, and 126 are at or close to the cell edges, the signal transmitted by any one of them can impose a strong interference on the signal received by an un-intended base station.

In CoMP mode with fine time-scale coordination, the signals transmitted by the mobile users 122, 124, and 126 will either be on non-overlapping frequency bands or with suitably adjusted power levels. Furthermore the intended base station for each mobile user can also be dynamically changed. This coordination will ensure that the signal transmitted by each mobile is received with a sufficient quality by its intended base station while imposing a small enough interference on the un-intended base stations.

Fine time-scale coordination implemented using a central scheduler requires exact uplink channel information for all users at the scheduler and the provision for that scheduler to convey relevant dynamic scheduling information (such as MCS and CRC etc.) to each base station, which would be needed by that base station to decode the transmissions from desired users. However, in deployments in which the ideal backhaul connections are absent, such fast coordination will not be possible. Thus, a two time-scale approach is proposed below. Here coordination is only performed at a coarse time scale and the set of users to be connected to (or served by) each base station is decided along with the average transmission power levels for the connected users.

Figure 2:
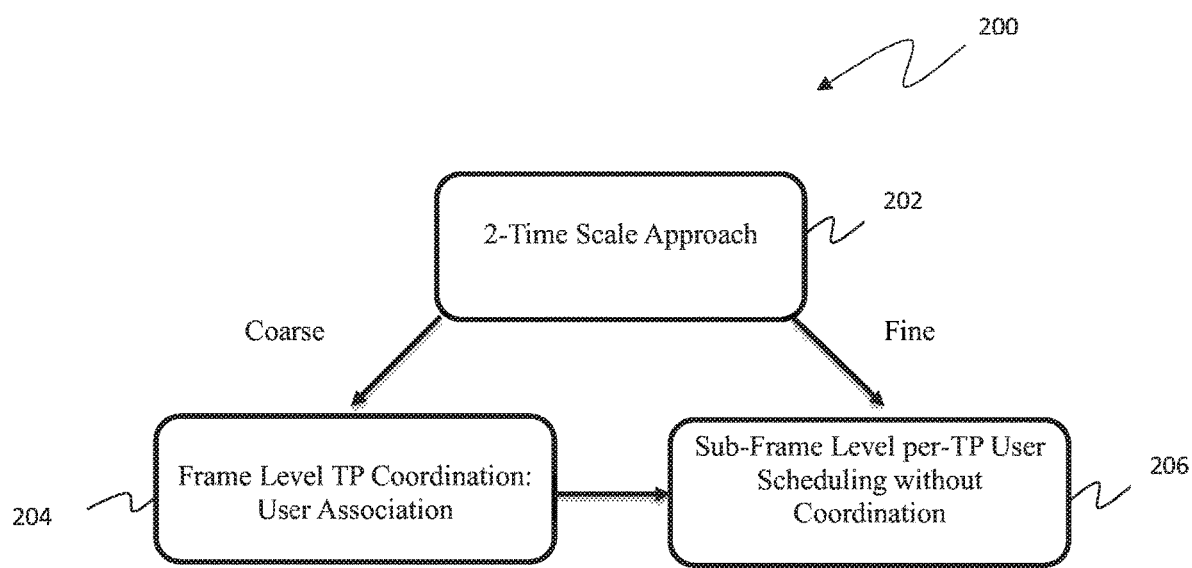
FIG. 2 is a block/flow diagram of a two-time scale approach for an uplink (UL) user association algorithm, in accordance with embodiments of the present invention.

FIG. 2 is a block/flow diagram of a two-time scale approach for an uplink (UL) radio resource management, in accordance with embodiments of the present invention.

The flowchart 200 illustrates a two time-scale approach 202. The first block 204 is a frame level TP coordination for user association. The second block 206 is a sub-frame level per TP user scheduling without coordination. The first block 204 of the user association can be performed by a two-stage algorithm including either a greedy (FIG. 3) or a decentralized first stage and a second local search stage (FIG. 4).

Figure 3:
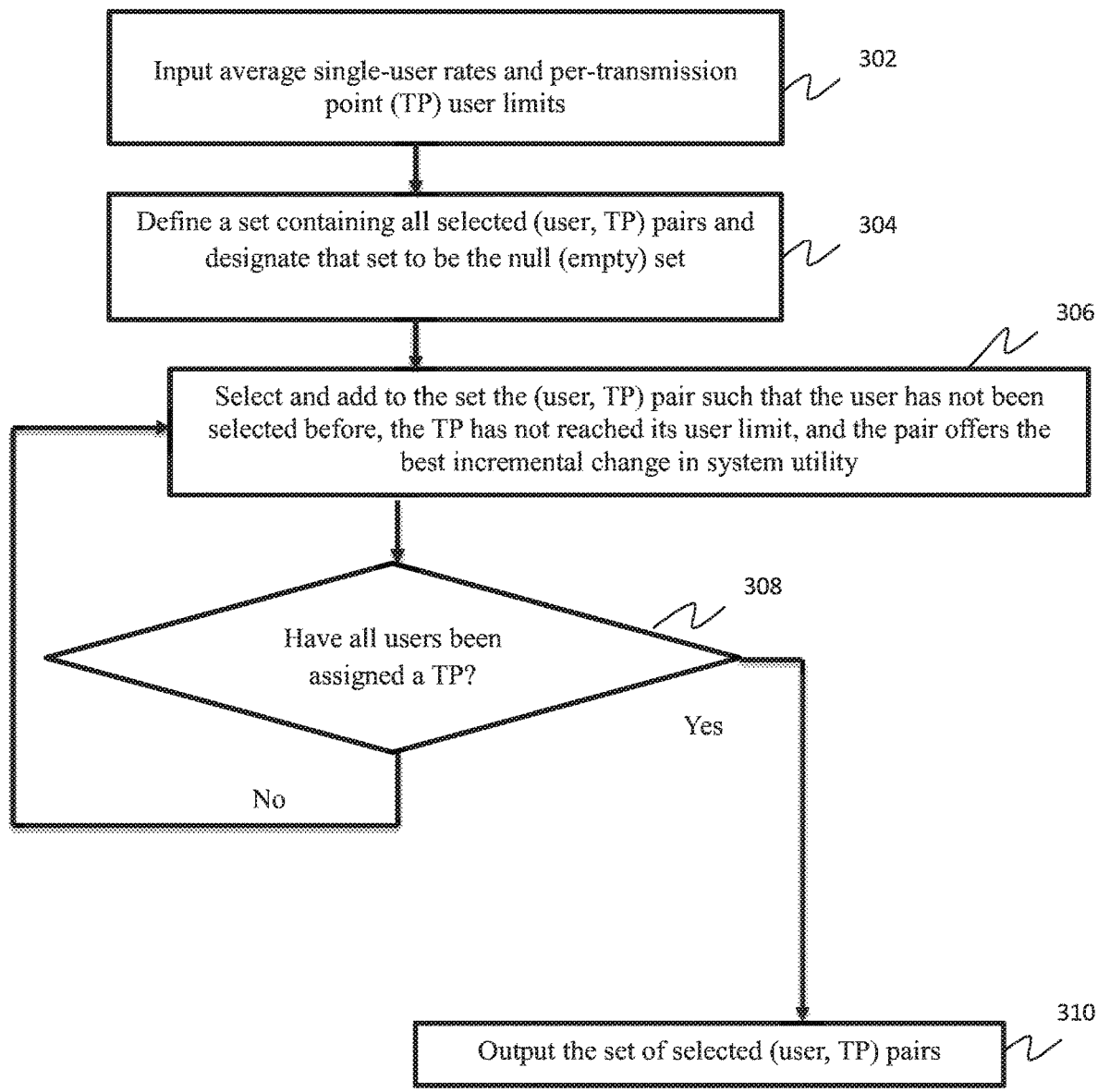
FIG. 3 is a block/flow diagram of the first stage of the two-stage user association performed by either a greedy stage. Alternatively, the first stage can also be performed by a decentralized stage, in accordance with embodiments of the present invention.
Figure 4:
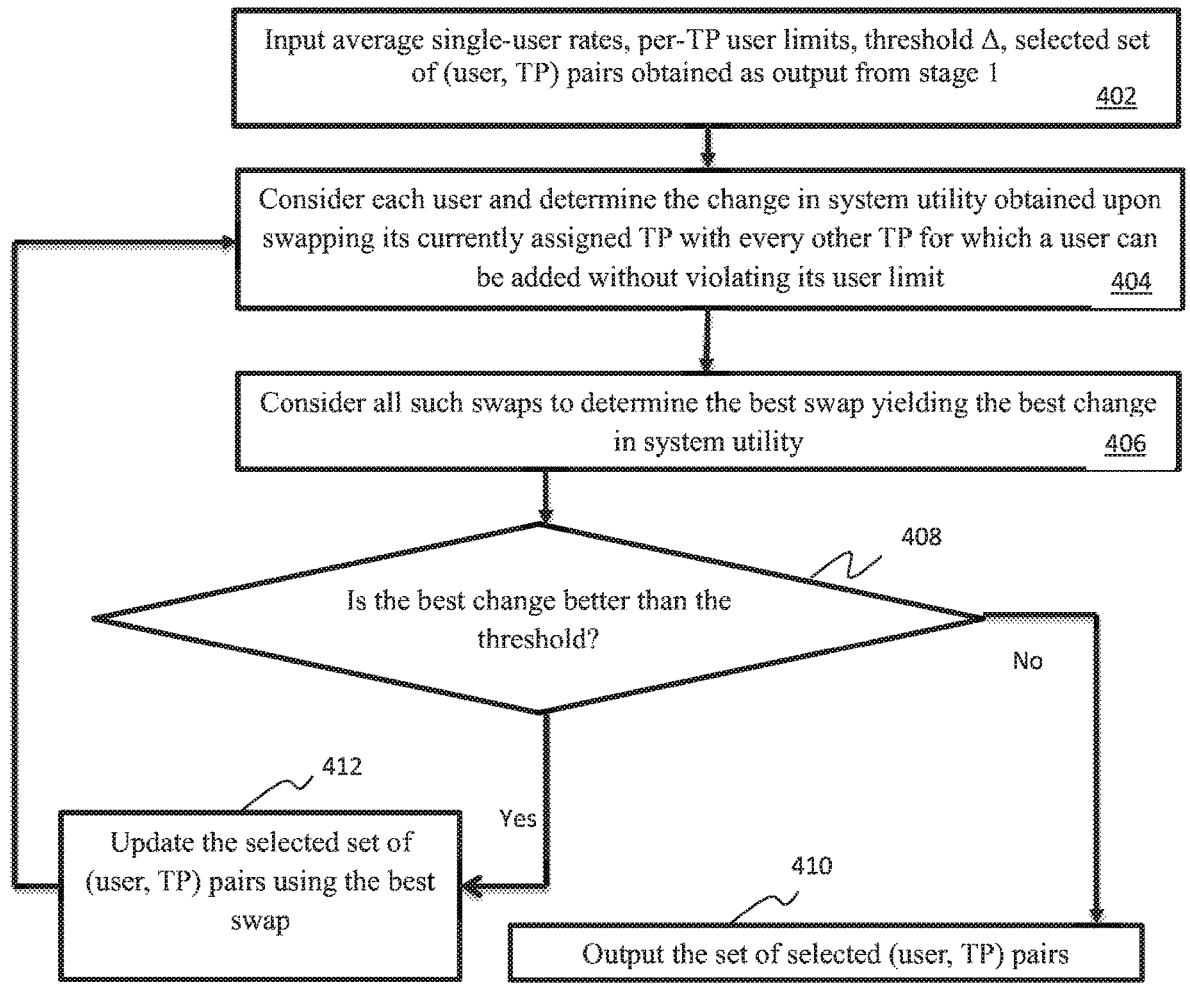
FIG. 4 is a block/flow diagram of the second stage of the user association performed by a local search stage, in accordance with embodiments of the present invention.

FIG. 3 is a block/flow diagram of the first stage of the user association performed by a greedy stage. The first stage can also be performed by a decentralized stage, in accordance with embodiments of the present invention.

In the first stage, when performed by the greedy stage (FIG. 3), it is assumed that the sum of per-TP user limits (over all the TPs) is at-least as large as the number of users.

At block 302, an input to the algorithm includes average single-user rates, as well as per-TP user limits.

At block 304, a set containing all selected (user, TP) pairs is defined and such set is designated to be the null (empty) set.

At block 306, select and add to the set the (user, TP) pair such that the user has not been selected before, the TP has not reached its user limit, and the pair offers the best incremental change in system utility.

At block 308, it is determined whether all users have been assigned a TP. If NO, the process proceeds to block 306. If YES, the process proceeds to block 310.

At block 310, the set of selected (user, TP) pairs is output.

For the decentralized (or baseline) first stage, each user independently associates to the TP from which it sees the strongest average signal strength. This association assumes that there are no per-TP user limits. Alternatively, each TP b with some user limit, say $N_b$, can accept the first $N_b$ users which request to associate (ties can be broken arbitrarily) after which it will block all requests. A user whose request is blocked will simply request the TP from which it sees the next strongest average signal strength and so on.

FIG. 4 is a block/flow diagram of the second stage of the user association performed by a local search stage, in accordance with embodiments of the present invention.

At block 402, an input to the algorithm includes average single-user rates, per-TP user limits, threshold Δ, and selected set of (user, TP) pairs obtained as output from stage 1.

At block 404, consider each user and determine the change in system utility obtained upon swapping its currently assigned TP with every other TP for which a user can be added without violating its user limit.

At block 406, consider all such swaps to determine the best swap yielding the best change in system utility.

At block 408, it is determined whether the best change is better than the threshold. If NO, the process proceeds to block 410. If YES, the process proceeds to block 412.

At block 410, the set of selected (user, TP) pairs is output.

At block 412, update the selected set of (user, TP) pairs using the best swap.

It is noted that other corresponding details such as determining the change in system utility upon associating a hitherto un-associated user to a TP or the change in system utility upon swapping the assigned TP for an associated user, are provided herein.

Regarding SSPS algorithms:

Let U denote the set of all users in the cluster and let B denote the set of all TPs in the cluster with cardinality |B|=B. Let $U^b$ denote the set of users associated to TP b∈B. Let φ denote the empty set and let W be the system bandwidth which is proportional to the total number of available RBs, $N_{RB}^{DL}$. For each user u and TP b, let $PL_{u,b}$ denote the path-loss factor (including shadowing) seen at TP b from user b. Let $\sigma^2$ denote the power spectral density (PSD) of noise plus out-of-cluster interference (at each TP). It is ensured that each TP is associated to no more than Ulimit users, where Ulimit is a specified number. It is assumed that B×Ulimit is at-least as large as the total number of users, so that each user can be associated to one TP.

Concerning stage 1 (greedy):
Initialize with $\tilde{U}$=U and $\tilde{B}$=B and $U^b$=φ for all b∈B
Repeat
For each TP, b∈$\tilde{B}$, that has not reached user limit and un-associated user, u∈$\tilde{U}$, do determine system utility by:

$$g(u,b,\{U^s, s=1, \ldots, B\}) = \Sigma_{t=1}^B r(u,b,t, \{U^s, s=1, \ldots, B\})$$

End For
Determine $$(u^*, b^*) = \arg\max_{u \in \tilde{U}, b \in \tilde{B}} \{g(u, b, \{U^s, s = 1, \ldots, B\})\} \quad (1G)$$

Add u* to $U^{b*}$ and remove u* from $\tilde{U}$.
If |$U^{b*}$|=Ulimit Then
remove b* from $\tilde{B}$.
End If
Until $\tilde{U}$ is empty The flowchart for greedy stage 1 is shown in FIG. 3.

For stage-1 baseline:
Each user independently associates to the TP from which it observes the strongest average signal strength. The baseline scheme assumes that Ulimit itself is at-least as large as the number of users so that independent selection by each user does not result in an infeasible selection. Alternatively, each TP b with some user limit, say $N_b$, can accept the first $N_b$ users which request to associate (ties can be broken arbitrarily) after which it will block all requests. A user whose request is blocked will simply request the TP from which it sees the next strongest average signal strength and so on.

Concerning Stage 2 (Local Search Stage):
Initialize with output of Stage 1: user sets {$U^b$, b=1, ..., B} and corresponding system utility v. Initialize a relative improvement threshold Δ>0. Set done=0.

Repeat
For each TP b∈B and user u∈U
Do determine system utility change by:

$$h(u,b,\{U^s, s=1, \ldots, B\})-v$$

End For
Determine $$(u^*, b^*) = \arg\max_{u \in U, b \in B} \{h(u, b, \{U^s, s = 1, \ldots, B\}) - v\} \quad (1LS)$$

Let v*=h(u*,b*,{$U^s$, s=1, ..., B})
If v*−v>Δ|v|
Set v=v*
Remove user u* from its current assigned TP and add u* to $U^{b*}$.
Else
Set done=1
End If
Until done=1

The flowchart for local search stage 2 is shown in FIG. 4.

In the greedy stage, the sum of log of rates for TP b, if an un-associated user u is (tentatively) associated to it, given the current user assignments {$U^s$, s=1, ..., B}, is given by:

$$r(u, b, b, \{U^s, s = 1, \ldots, B\}) = \log\left(\frac{Wg(|U^b|+1)}{|U^b|+1}\log\left(1 + \frac{\rho_{u,b}PL_{u,b}^{-1}}{\sigma^2 + \sum_{s \in B, s \neq b}\sum_{k \in U^s}\rho_{k,s}PL_{k,b}^{-1}/|U^s|}\right)\right) + \sum_{l \in U^b}\log\left(\frac{Wg(|U^b|+1)}{|U^b|+1}\log\left(1 + \frac{\rho_{l,b}PL_{l,b}^{-1}}{\sigma^2 + \sum_{s \in B, s \neq b}\sum_{k \in U^s}\rho_{k,s}PL_{k,b}^{-1}/|U^s|}\right)\right), \quad (2G)$$

In (2G), $PL_{u,b}$ denotes the path-loss factor for the link between user u and TP b, and $\rho_{u,b}$ denotes the transmit PSD assigned to user u when it is associated with TP b. This PSD can be computed as:

$$\rho_{u,b} = \min\{P_{u,max}(|U^b|+1)W, P_o PL_{u,b}^{\alpha}, \Gamma_o PL_{u,b,int}\}$$

Where $PL_{u,b,int}$ is the smallest path-loss factor among all links between user u and TPs other than TP b, i.e., $PL_{u,b,int} = \min_{s \in B: s \neq b}\{PL_{u,s}\}$.

$P_{u,max}$ denotes the maximum transmit power of user u. $P_o, \Gamma_o$ denote the desired signal PSD level at the intended receiving TP and the target interference PSD level at the other (most strongly) interfered TP, respectively.

Similarly, $\rho_{l,b} = \min\{P_{l,max}(|U^b|+1)/W, P_o PL_{l,b}^{\alpha}, \Gamma_o PL_{l,b,int}\}, \forall l \in U^b$ and $$\rho_{k,s} = \min\{P_{k,max}|U^s|/W, P_o PL_{k,s}^{\alpha}, \Gamma_o PL_{k,s,int}\} \text{ with}$$
$$PL_{k,s,int} = \min_{t \in B: t \neq s}\{PL_{k,t}\}$$

Further, the scaling factor g(|$U^t$|+1) represents the multi-user diversity boost obtained when the load (number of associated users) is, |$U^t$|+1. One can use one of two choices to determine this multi-user boost term:

choice-1 $\quad g(m) = \sum_{j=1}^{m} 1/j, \forall m \geq 1$ choice-2 $\quad g(m) = 1 + A\sqrt{\ln(m)}, \forall m \geq 1, A \geq 0$ In choice-2, the scalar A is a tuning parameter. For choice-2, A=0.12 was used.

The sum log rate for any other TP t: t≠b, if user u is associated to TP b, given the current user assignments $\{U^s, s=1, \ldots, B\}$ is given by:

$$r(u, b, t, \{U^s, s=1, \ldots, B\}) = \sum_{l \in U^t} \log\left(\frac{Wg(|U^t|)}{|U^t|} \log\left(1 + \frac{\rho_{l,t} PL_{l,t}^{-1}}{\sigma^2 + \rho_{u,b} PL_{u,t}^{-1}/(|U^b|+1) + \sum_{k \in U^b} \rho_{k,b} PL_{k,t}^{-1}/(|U^b|+1) + \sum_{\substack{s \in B, \\ s \neq t, s \neq b}} \sum_{k \in U^s} \rho_{k,s} PL_{k,t}^{-1}/|U^s|}\right)\right), \quad (3G)$$

After the first stage (either greedy or baseline) terminates, one uses the output user sets $\{U^s, s=1, \ldots, B\}$ to determine the current system utility as:

$$v = \sum_{t=1}^{B} \sum_{l \in U^t} \log\left(\frac{Wg(|U^t|)}{|U^t|} \log\left(1 + \frac{\rho_{l,t} PL_{l,t}^{-1}}{\sigma^2 + \sum_{s \in B, s \neq t} \sum_{k \in U^s} \rho_{k,s} PL_{k,t}^{-1}/|U^s|}\right)\right) \quad (4G)$$

In the local search stage, for each user u let $b_u$ be the TP to which user u is currently associated to. The system utility if user u is associated to TP $b=b_u$ is clearly equal to the current value v. The system utility if user u is instead associated to any other TP $b:b \neq b_u$, given the current user assignments $\{U^s, s=1, \ldots, B\}$, is given by $h(u,b,\{U^s, s=1, \ldots, B\})$.

To compute $h(u,b,\{U^s, s=1, \ldots, B\})$ one first checks if $|U^b|$=Ulimit, in which case one sets $h(u,b,\{U^s, s=1, \ldots, B\})=-\infty$. On the other hand, if $|U^b|<$Ulimit, user sets are defined as follows:

$\tilde{U}^s = U^s, \forall s \in B \& s \neq b \& s \neq b_u$ $\tilde{U}^b = U^b \cup \{u\}$ $\tilde{U}^{b_u} = U^{b_u} \setminus \{u\}$ and then determine:

$$h(u, b, \{U^s, s=1, \ldots, B\}) = \sum_{\substack{t=1,\ldots,B \\ \tilde{U}^t \neq \phi}} \sum_{l \in \tilde{U}^t} \log\left(\frac{Wg(|\tilde{U}^t|)}{|\tilde{U}^t|} \log\left(1 + \frac{\tilde{\rho}_{l,t} PL_{l,t}^{-1}}{\sigma^2 + \sum_{s \in B, s \neq t} \sum_{k \in \tilde{U}^s} \tilde{\rho}_{k,s} PL_{k,t}^{-1}/|\tilde{U}^s|}\right)\right), \quad (2LS)$$

where $\tilde{\rho}_{k,s} = \min\{P_{k,max}|\tilde{U}^s|/W, P_o PL_{k,s}^\alpha, \Gamma_o PL_{k,s,int}\}$, $\forall s \in B, \in \tilde{U}^s$.

In conclusion, the exemplary embodiments of the present invention consider the issue of associating users to transmission points over the uplink (UL) of a Heterogeneous Network (HetNet). The exemplary embodiments describe simple (implementable) algorithms for determining user association, wherein each user must be associated to one transmission node, such that the proportional fairness utility is optimized. The proposed algorithms account for uplink power control and allow for setting interference limits. It is observed that using an association optimized for the downlink, also over the uplink, can result in a degradation, which suggests that future evolutions of LTE should consider decoupling uplink and downlink. It is also observed that contrary to the downlink, a greedy user association does not work well over the uplink due to the interference variability problem.

The term "present invention" should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

The term "module/sub-module" refers to at least any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

The term "computer" refers to at least any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Additionally, mathematical expressions are contained herein and those principles conveyed thereby are to be taken as being thoroughly described therewith. It is to be understood that where mathematics are used, such is for succinct description of the underlying principles being explained and, unless otherwise expressed, no other purpose is implied or should be inferred. It will be clear from this disclosure overall how the mathematics herein pertain to the present invention and, where embodiment of the principles underlying the mathematical expressions is intended, the ordinarily skilled artisan will recognize numerous techniques to carry out physical manifestations of the principles being mathematically expressed.

The algorithm of the present invention can be executed on a general purpose computer system. The exemplary general purpose computing system includes a conventional personal computer or the like, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory includes read-only memory (ROM) and random access memory (RAM). A basic input/output system (BIOS), containing the basic routines that help to transfer information between elements within the personal computer, such as during start-up, is stored in ROM.

The personal computer may further include a hard disk drive for reading from and writing to a hard disk (not shown), a magnetic disk drive for reading from or writing to a removable magnetic disk, and an optical disk drive for reading from or writing to a removable optical disk such as a CD-ROM or other optical media. The hard disk drive, magnetic disk drive, and optical disk drive are connected to the system bus by a hard disk drive interface, a magnetic disk drive interface, and an optical drive interface, respectively. The drives and their associated computer-readable media provide non-volatile storage of computer readable instructions, data structures, program modules and other data for the personal computer.

A number of program modules may be stored on the hard disk, magnetic disk, optical disk, ROM or RAM, including an operating system, one or more application programs, other program modules and program data. A user may enter commands and information into the personal computer through input devices such as a keyboard and pointing device. Other input devices (not shown) may include a microphone, joystick, game pad, satellite disk, scanner, or the like. These and other input devices are often connected to the processing unit through a serial port interface that is coupled to the system bus, but may be connected by other interfaces, such as a parallel port, game port, or universal serial bus (USB). A monitor or other type of display device is also connected to the system bus via an interface, such as a video adapter. In addition to the monitor, a personal computer typically includes other peripheral output devices (not shown), such as speakers and printers. The exemplary system also includes a host adapter, a Small Computer System Interface (SCSI) bus, and an external storage device connected to the SCSI bus.

The personal computer for operating the algorithm may operate in a networked environment using logical connections to one or more remote computers, such as a remote computer. The remote computer may be another personal computer, a server, a router, a network PC, a peer device or other common network node, and typically includes many or all of the elements described above relative to the personal computer. The logical connections can include a local area network (LAN) and a wide area network (WAN) 152. Such networking environments are commonplace in offices, enterprise-wide computer networks, intranets, and the Internet.

When used in a LAN networking environment, the personal computer is connected to the LAN through a network interface or adapter. When used in a WAN networking environment, the personal computer typically includes a modem or other means for establishing communications over the wide area network, such as the Internet. The modem, which may be internal or external, is connected to the system bus via the serial port interface. In a networked environment, program modules depicted relative to the personal computer, or portions thereof, may be stored in the remote memory storage device. It will be appreciated that the network connections shown are exemplary and other means of establishing a communications link between the computers may be used.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method executed on a processor for associating users to transmission points over a wideband model for an uplink (UL) of a heterogeneous network (HetNet), the method comprising:

communicating, via the processor, with a cluster of transmission points;

associating, via the processor, each user to one transmission point within the cluster of transmission points over the UL of the HetNet, such that each user is associated to any one of the transmission points over a frame duration, by a two-stage wideband UL user association procedure based on an average slowly varying metric relevant for a period longer than a backhaul latency;

wherein said metric of each user is responsive to one or more of: transmit power spectral density of that user, a path loss factor between that user and its associated transmission point and at least one other path-loss factor between that user and other transmission points; and performing, via the processor, sub-frame scheduling independently by each transmission point within the cluster of transmission points over a set of users associated with it by the two-stage procedure;

wherein the first stage of the two-stage UL user association procedure is performed by a greedy search algorithm, wherein a sum of log of rates for a transmission point (TP) is given by:

$$r(u, b, b, \{U^s, s=1, \ldots, B\}) = \log\left(\frac{Wg(|U^b|+1)}{|U^b|+1}\log\left(1 + \frac{\rho_{u,b}PL_{u,b}^{-1}}{\sigma^2 + \sum_{s \in B, s \neq b}\sum_{k \in U^s}\rho_{k,s}PL_{k,b}^{-1}/|U^s|}\right)\right) + \sum_{l \in U^b}\log\left(\frac{Wg(|U^b|+1)}{|U^b|+1}\log\left(1 + \frac{\rho_{l,b}PL_{l,b}^{-1}}{\sigma^2 + \sum_{s \in B, s \neq b}\sum_{k \in U^s}\rho_{k,s}PL_{k,b}^{-1}/|U^s|}\right)\right);$$

where $PL_{u,b}$ denotes a path-loss factor for a link between user u and TP b, $\rho_{u,b}$ denotes a transmit power spectral density (PSD) assigned to user u when it is associated with TP b, W denotes system bandwith, and $\sigma^2$ denotes a PSD of noise plus out-of-cluster interference.

2. The method of claim 1, wherein the PSD can be computed as:

$$\rho_{u,b} = \min\{P_{u,max}(|U^b|+1)/W, P_0PL_{u,b}^\alpha, \Gamma_0PL_{u,b,int}\},$$

where $PL_{u,b,int}$ is a smallest path-loss factor among all links between user u and TPs other than TP b, such as, $PL_{u,b,int} = \min_{s \in B: s \neq b}\{PL_{u,s}\}$, and where $P_{u,max}$ denotes a maximum transmit power of user u, $P_0, \Gamma_0$ denotes a desired signal PSD level at an intended receiving TP and a target interference PSD level at the other interfered TP, respectively.

3. The method of claim 2, wherein a sum log rate for any other TP t: $t \neq b$, if user u is associated to TP b, given the current user assignments $\{U^s, s=1, \ldots, B\}$ is given by:

$$r(u, b, t, \{U^s, s=1, \ldots, B\}) = \sum_{l \in U^t}\log\left(\frac{Wg(|U^t|)}{|U^t|}\log\left(1 + \frac{\rho_{l,t}PL_{l,t}^{-1}}{\sigma^2 + \rho_{u,b}PL_{u,t}^{-1}/(|U^b|+1) + \sum_{k \in U^b}\rho_{k,b}PL_{k,t}^{-1}/(|U^b|+1) + \sum_{\substack{s \in B, k \in U^s \\ s \neq t, s \neq b}}\rho_{k,s}PL_{k,t}^{-1}/|U^s|}\right)\right).$$

4. The method of claim 3, wherein after the first stage of the two-stage UL user association procedure terminates, an output a user sets $\{U^s, s=1, \ldots, B\}$ to determine a current system utility is given as:

$$v = \sum_{t=1}^{B} \sum_{l \in U^t} \log\left(\frac{Wg(|U^t|)}{|U^t|} \log\left(1 + \frac{\rho_{l,t} PL_{l,t}^{-1}}{\sigma^2 + \sum_{s \in B, s \neq t} \sum_{k \in U^s} \rho_{k,s} PL_{k,t}^{-1}/|U^s|}\right)\right).$$

* * * * *